Nov. 16, 1965    M. I. GERSTINE    3,218,590
PRESSURE RESPONSIVE DEVICE
Filed Aug. 23, 1962    2 Sheets-Sheet 1
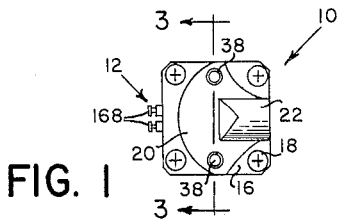
FIG. 1    FIG. 2
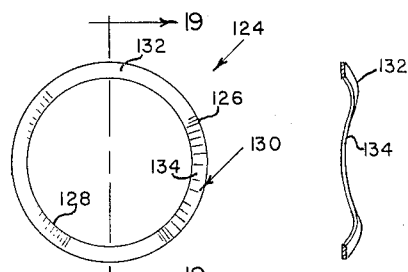
FIG. 18    FIG. 19
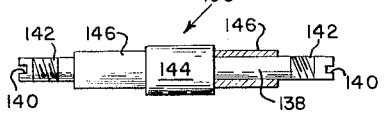
FIG. 20
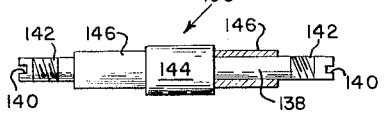
FIG. 21
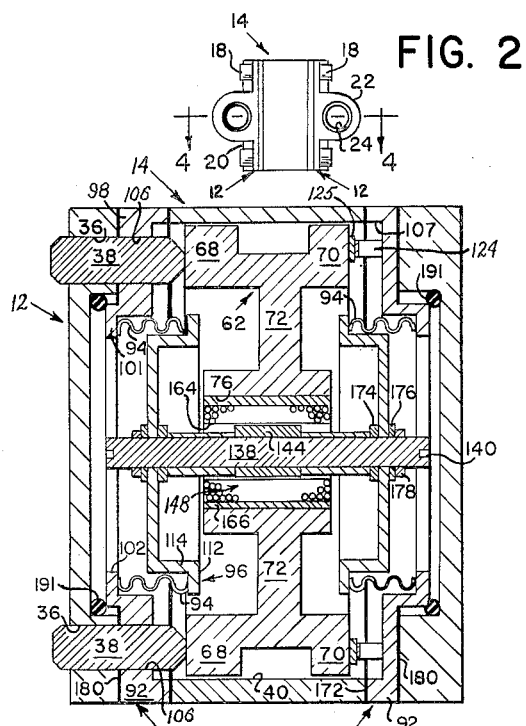
FIG. 3    FIG. 5
FIG. 4
MILTON I. GERSTINE
INVENTOR
BY Frank C. Leach
and Franklin J. Visek
ATTORNEYS Nov. 16, 1965  M. I. GERSTINE  3,218,590
PRESSURE RESPONSIVE DEVICE
Filed Aug. 23, 1962  2 Sheets-Sheet 2
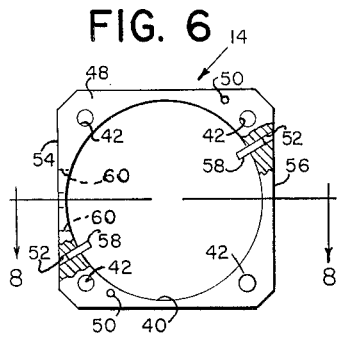
FIG. 6
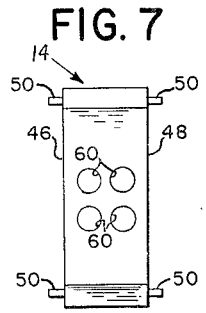
FIG. 7
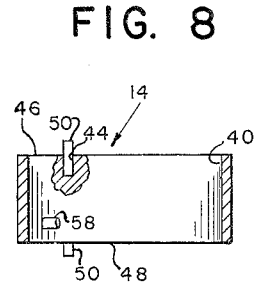
FIG. 8
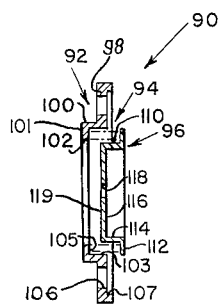
FIG. 11
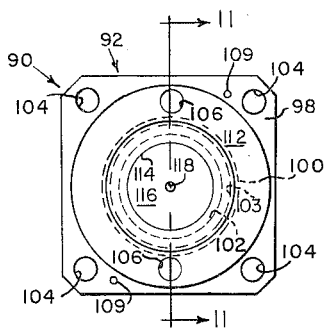
FIG. 9
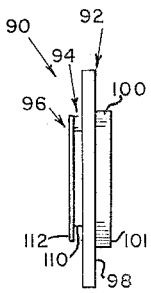
FIG. 10
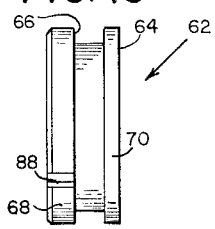
FIG. 13
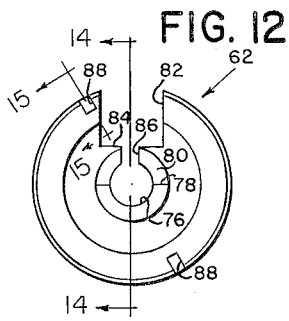
FIG. 12
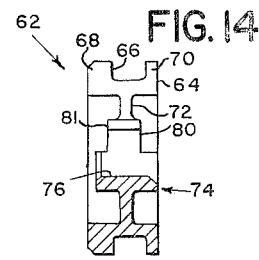
FIG. 14
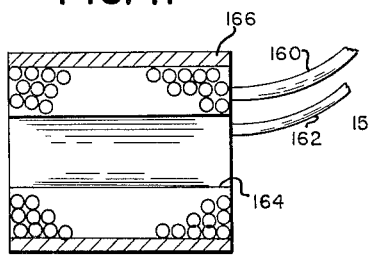
FIG. 17
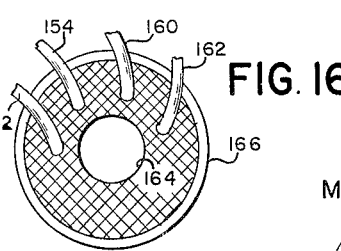
FIG. 16
FIG. 15
MILTON I. GERSTINE
INVENTOR.
BY Frank C. Leach
Franklin J. Visek
ATTORNEYS United States Patent Office 3,218,590
Patented Nov. 16, 1965

3,218,590
PRESSURE RESPONSIVE DEVICE
Milton I. Gerstine, Ardentown, Del., assignor to The Boeing Company, Seattle, Wash., a corporation of Delaware
Filed Aug. 23, 1962, Ser. No. 219,051
6 Claims. (Cl. 336—30)

This invention relates to responsive means for translating a given input stimulus into an electrical output and, more particularly, to a pressure responsive device that translates pressure applied thereto into electrical output energy for purposes of measurement and/or other desired functions.

Pressure responsive devices, generally, and pressure responsive devices that translate pressure into electrical output are well known in the art. The present invention in its broadest terms is also directed to a device of the pressure responsive type, which translates a pressure stimulus into an electrical output.

The present invention, however, represents a substantial advance in the art in that it provides new and novel structure to accurately provide sensitivity to a pressure source over a wide range of stimuli. Concomitantly this invention provides a device that is compact, and impervious to contamination of the deleterious effects of dust, moisture, or corrosive gases or fluids by virtue of unique construction and assembly. In addition to the novel structure of the various elements, there is provided, by this invention, unique and novel means for balancing the device through novel mounting and adjusting means.

The pressure responsive device of the present invention comprises a small compact unit having a pair of oppositely disposed pressure responsive bellows assemblies. Between the bellows assemblies, and wholly isolated from pressure ports, is a unique resiliently biased and adjustably movable coil mount. A differential transformer, which is of rugged construction, is mounted in this movable coil mount and between the bellows assemblies. An iron slug or core of the differential transformer is mounted on a movable shaft, which has its opposite extremities connected to the pressure responsive bellows assemblies.

As either or both of the bellows assemblies respond to input pressure stimulation, the position of the core is adjusted with respect to an electrical centerline of the transformer coils. If the position of the core is moved from the electrical centerline, and electrical output occurs; the output increases proportionally to the distance of core movement from the centerline. The sign of the output depends upon the direction of core movement since a 180° phase change occurs when the core crosses from one side of the electrical centerline to the other.

The differential transformer of this invention is rugged and sensitive. Due to its sensitivity the pressure responsive device of this invention has what might be termed negligible "threshold." That is, an output will be produced in response to a negligible movement of the core from the transformer electrical centerline by negligible input pressure stimulation. Since the output from the transformer will vary whenever the core moves, this invention offers infinite resolution. That is, a continuous input will result in a continuous output as opposed to a discontinuous or stepped output resulting from a continuous input.

It may be clearly seen from the foregoing that there is herein provided a compact pressure responsive device that is fully adjustable for accurate calibration. Additionally, this invention is sensitive, accurate, uniquely sealed from the pressure ports to avoid the contaminating and deleterious effects of dust, moisture, corrosive gases or fluids, or the like, and is simply and ruggedly constructed for maximum service and symmetrically arranged.

Accordingly, it is an object of the present invention to provide a pressure responsive device which translates pressure stimuli into electrical energy and which eliminates from the mechanism thereof contaminating and deleterious elements of the input.

Another object is the provision of a pressure responsive device which has a negligible "threshold" and which has infinite resolution in translating input pressure stimuli to electrical output energy.

A further object of the present invention is to provide a pressure responsive device for translating pressure stimuli to electrical energy and which is of a rugged but uncomplicated structure while being sensitive and accurate.

Still another object is the provision of a sensitive pressure responsive device which accurately transduces pressure stimuli to electrical energy while maintaining the mechanism thereof free from the contaminating and deleterious effects of dust, moisture, corrosive gases or fluids, or the like entering through pressure ports.

Another object of the present invention is to provide a compact and sensitive transducer which is uncomplicated but rugged in construction and which has a negligible "threshold" for accurately transducing pressure stimuli to electrical energy while maintaining the mechanism thereof free from contaminating and deleterious elements associated with the pressure stimuli.

A further object is the provision of a pressure responsive transducer for effectuating and controlling an electrical output indicative of pressure input.

Still another object of the present invention is to provide a pressure responsive device for effectuating and controlling an electrical output in both magnitude and phase and which is indicative of pressure input.

Other objects of this invention will be readily preceived from the following description, drawings, and claims.

This invention relates to a pressure responsive device having a housing with a chamber therein. Input means are disposed in the pressure responsive device for supplying fluid pressure to at least one of a plurality of movable means, which are connected to the housing for sealing the chamber from the input means. Electrical means are mounted in the chamber and have an electrical input. A core is mounted in the chamber on shaft means connected to each of the movable means for effectuating and controlling an electrical output from the electrical means in both magnitude and phase relationship with respect to the electrical input.

The attached drawings illustrate a preferred embodiment of the invention, in which:

FIGURE 1 is a side elevational view of the novel transducer of the present invention;

FIGURE 2 is a bottom plan view of the transducer of the invention and illustrates the two pressure ports;

FIGURE 3 is an enlarged sectional view taken substantially along the line 3—3 of FIGURE 1;

FIGURE 4 is an enlarged sectional view taken substantially along the line 4—4 of FIGURE 2;

FIGURE 5 is a vertical sectional view of one of the end cover members showing the pressure passage arrangement therein;

FIGURE 6 is an elevational view, partly in section, of the intermediate housing of the present invention;

FIGURE 7 is a top plan view of the intermediate housing shown in FIGURE 6, taken from the left side of FIGURE 6 and showing the electrical lead openings therein;

FIGURE 8 is a sectional view taken substantially along the line 8—8 of FIGURE 6 and further partially broken away to show the locating and mounting pins;

FIGURE 9 is an elevational view of one of the novel bellows assemblies of the present invention;

FIGURE 10 is an end elevational view of the bellows assembly of FIGURE 9 taken from the right side of FIGURE 9;

FIGURE 11 is a sectional view taken substantially along the line 11—11 of FIGURE 9 and showing the location of the bellows in phantom lines;

FIGURE 12 is a plan view of an adjustable mount for mounting the transformer coil of the present invention;

FIGURE 13 is an elevational view of the mount shown in FIGURE 12 and taken from the right side thereof;

FIGURE 14 is a sectional view taken substantially along the line 14—14 of FIGURE 12;

FIGURE 15 is a fragmentary sectional view taken substantially along the line 15—15 of FIGURE 12;

FIGURE 16 is an end elevational view of the novel coil of the present invention showing the mounting of the leads from the coil;

FIGURE 17 is a vertical sectional view of the coil shown in FIGURE 16;

FIGURE 18 is a plan view of the wave type spring employed for resiliently mounting the coil mount of the present invention;

FIGURE 19 is a sectional view taken substantially along the line 19—19 of FIGURE 18;

FIGURE 20 is a side elevational view, partially in section, of the novel shaft-core assembly of the present invention showing the manner of mounting the spacers to locate the core with respect to the shaft; and FIGURE 21 is a wiring diagram of the coil of the present invention.

Referring to the drawings, and particularly to FIGURES 1 and 2, there is shown a transducer 10, which includes a pair of end cover members 12 mounted on either side of a center or intermediate housing 14. As clearly shown in FIGURES 1 and 4, each of the end cover members 12, which preferably are formed of aluminum alloy, has a planar portion 16. The four corners of the portion 16 are provided with apertures to receive mounting screws 18, which secure the members 12, bellows assemblies 90, and the housing 14 together. Between the four screws 18, on the planar portion 16, is a raised integral boss 20, which accommodates an interior porting arrangement.

Extending upwardly from the bottom of the transducer 10, as viewed in FIGURE 1, and between opposite parallel sides of the member 12 is a relatively large semi-circular portion 22 in which is drilled a pressure port or bore 24. As illustrated in FIGURES 4 and 5, the bore 24 has internal threads 26 for threadedly receiving a pressure connector or plug.

As clearly shown in FIGURE 5, the end cover member 12 has an inner or mounting face 28, which is flat for abutment with the adjacent bellows assembly 90 that is mounted between the member 12 and the housing 14. A counterbore 30 is provided in the face 28 for accommodating a portion of the bellows assembly 90. Extending outwardly from the inner face 32 of the counterbore 30 is a bore 34, which intersects with an upper end portion of the bore 24. Thus, the bore 24, the bore 34, and the counterbore 30 provide a series of interconnected passages for the admission of pressure to the interior side of the cover member 12 and, consequently, the transducer 10. Since both of the cover members 12 are similar, it should be understood that the pressure responsive transducer of the invention has two such series of interconnected pressure passages.

While the cover members 12, which are mounted on substantially opposite sides of the intermediate housing 14 (see FIGURES 2 and 4), are essentially similar, one cover member mounts a pair of adjusting screws 38. The adjusting screws 38 adjust a coil mount 62 within the transducer 10. Referring to FIGURES 1 and 3, it is seen that this cover member 12 has a pair of threaded apertures 36 adjacent the outermost edges of the integral boss 20 to receive the adjusting or calibrating screws 38.

FIGURES 6 through 21 disclose the details of the several novel elements of the present invention. In FIGURES 6 through 8, there is illustrated the intermediate or center housing 14, which is preferably formed of aluminum alloy. The housing 14 is of generally square configuration in plan form and has a large axially extending circular bore 40, which forms a chamber for housing an electrical output producing transformer. Threaded apertures 42, which receive the securing screws 18 to fully secure the assembly, are disposed adjacent the four corners of the housing 14.

Two small holes 44 are drilled partially through opposite parallel faces 46 and 48 of the housing 14 to press fittedly receive locating pins 50. When the locating pins 50 are press fittedly inserted into holes 44, they extend outwardly beyond the faces 46 and 48 as clearly seen in FIGURE 7. The locating pins 50 slidably engage similar apertures 109 (see FIGURE 9), which extend through the bellows assemblies 90. Thus, the locating pins 50 accurately locate the bellows assemblies 90 with respect to the housing 14.

Another pair of small holes 52 is employed in the housing 14. The holes 52 are in coaxial alignment and are disposed so that one is 30° above and the other is 30° below the centerline, which is illustrated by section line 8—8 as viewed in FIGURE 6. As clearly seen in FIGURE 6, the holes 52 extend from opposite parallel edges 54 and 56 of the housing 14 to connect perpendicularly with the circumferential wall of the bore 40. The holes 52 press fittedly receive pins 58, which protrude into the bore 40 to locate a transformer mount. Accordingly, both of the holes 52 are coaxial and also perpendicular to the circumferential wall of the bore 40. Thus, the pins 58 are both located in the lower portion of the housing 14 as is illustrated in FIGURE 8 by one of the pins 58. The outermost ends of the pins 58, which are within the holes 52, are peened therein for facilitating positive retention of the pins 58 in the holes 52.

Four threaded electrical lead bores 60, equally spaced on centers as seen in FIGURE 7, are disposed in the edge 54 of the housing 14 and connect with the bore 40. The bores 60 receive hollow electrical lead terminals for external electrical connection of a differential transformer mounted within the transducer 10.

In the assembled condition, the coil mount 62 (see FIGURES 12 through 14) is mounted within the bore or chamber 40 of the housing 14. The mount 62 also is preferably formed from aluminum alloy and is of generally circular configuration. The mount 62 is defined by an essentially annular body member 64 having an external circumferential channel 66, which defines a relatively thick circular arm 68 and a thin circular arm 70.

Extending radially inwardly from the inner diameter of the body 64 is an integral web 72, which is integrally connected to an axially disposed boss 74. The boss 74 has an axially extending through-bore 76. Each side of the boss 74 is counterbored or cut down to define stepped portions 80 and 81, as clearly seen in FIGURE 14, for purposes of mounting and accommodating electrical leads of a transformer.

As illustrated in FIGURE 12, a relatively wide rectangular slot 82 extends axially and radially inwardly from the outer periphery of the mount 62 through both of the arms 68 and 70 and the radial web 72. The slot 82 terminates with inner surface 84 of the slot 82 in an essentially tangential relationship to the boss 74. A smaller radially inwardly extending slot 86 connects the bore 76 of the boss 74 with the large slot 82.

As disclosed in FIGURES 12 and 15, there is a pair of diametrically opposed grooves 88 provided in and extending through the arm 68 in an essentially parallel relation to the axis of the bore 76. As viewed in FIGURE 12, the grooves 88 extend through the mount 62 and are located 30° to the left and 30° to the right of a centerline, which is illustrated by section line 14—14. When the coil mount 62 is assembled into the bore 40 of the housing 14, the grooves 88 engage with the pins 58, which protrude into the bore 40 of the housing 14. In this manner, the pins 58 accurately locate and guide movements of the mount 62 with respect to the housing 14.

The details of one of the two novel bellows assemblies 90 are shown in FIGURES 9 through 11. The bellows assembly 90 comprises three essential elements or parts, namely, a bellows mount 92, a bellows 94, and a bellows header 96.

The bellows mount 92 is defined by a generally square mounting portion 98 having an aperture 104 at each of the four corners thereof for receiving the mounting or securing screws 18. Extending axially and radially outwardly from one side of the mounting plate 98 is an integral circular boss 100, which has a circumferential lip 101 defining an axial bore 102. The boss 100 and the plate 98 also define an inner diameter 103 and an inner face 105 of the lip 101 for mounting the spring-like bellows 94.

The right hand face or side of the plate 98, as viewed in FIGURE 11, has a counterbore 107 to accommodate maximum relative movement of the header 96 in a minimal space. The counterbore 107 of one of the bellows assemblies 90 also accommodates a "wave" type spring 124 for resiliently biasing the mount 62.

The plate 98 of one of the two bellows assemblies 90 has a pair of apertures 106 located on a centerline, as illustrated by section line 11—11 in FIGURE 9, to permit passage therethrough of the adjusting screws 38. Two small holes 109 (see FIGURE 9) are drilled in the plate 98 between opposite pairs of the apertures 104. These holes 109 receive the locating pins 50 of the housing 14 for accurately mounting the bellows assemblies 90.

The bellows header 96 is of generally "hat-like" configuration and essentially thin-walled. The header 96 is defined by a circular boss portion 110 having a radially outwardly extending lip 112 at its open end, as clearly seen in FIGURE 11. The "hat-like" configuration of the header 96 also defines an inner bore 114 terminating in an inner wall 116. The wall 116 has a small axial aperture 118 to permit an adjustable shaft 138 to be mounted therein.

A tubular bellows 94 is mounted in leakproof relationship, as by solder, epoxy resins, brazing, or the like, between the face 105 of the lip 101 and the left most face of the lip 112, as viewed in FIGURE 11. The bellows 94 has circumferential flutes or convolutions, which impart the inherent resiliency to the bellows 94. The bellows 94, indicated in phantom lines in FIGURES 10 and 11 because of the confined space, is fully illustrated in FIGURES 3 and 4.

In FIGURES 18 and 19, there is shown the "wave" type spring 124, which is of generally annular construction having an outer diameter 126 and an inner diameter 128. As clearly seen in FIGURES 18 and 19, surface 130 of the spring 124 has successive equally spaced convex and concave undulations 132 and 134, respectively, from which the wave spring 124 obtains its resiliency. The purpose of the spring 124 is to resiliently bias the mount 62 toward the adjusting screws 38.

The details of the shaft-spacer-core assembly are shown in FIGURE 20. The assembly 136 comprises the circular or cylindrical shaft 138, preferably formed from non-magnetic material such as stainless steel, which has short diametrical slots 140 at its opposite ends. Opposite ends of the shaft 138 have short threaded portions 142 for receiving nuts, such as securing nuts 178 (see FIGURES 3 and 4). A soft iron annular core 144 is held or located centrally on the shaft 138 by a pair of elongated annular non-magnetic sleeves 146, which are formed preferably from stainless steel. The sleeves 146 are mounted on opposite sides and in abutting relation with the core 144.

FIGURE 21 illustrates the details of a differential transformer 148. The transformer 148, as seen schematically in FIGURE 21, includes a primary winding 150 having leads 152 and 154 for applying a reference voltage to the transformer. Symmetrical windings 156 and 158 form the secondary of the transformer and have respective leads 160 and 162 extending therefrom. While the primary coil 150 and the two symmetrically mounted secondary coils 156 and 158 are wound into the same cylindrical coil, the coils 156 and 158 are connected in a series bucking or opposing relationship.

As seen in FIGURES 16 and 17, the transformer 148 has a central cylindrical bore 164 for receiving the core 144. An annular sleeve 166, which mounts the transformer 148 in the bore 76 of the mount 62, surrounds the outside diameter of the coil windings of the transformer 148. Extending from one end of the transformer 148 are the four leads 152, 154, 160 and 162.

FIGURES 3 and 4, which are greatly enlarged for clarity, illustrate the assembly of the several elements of FIGURES 6 through 21, which comprise the transducer 10 of the present invention. The mount 62 is mounted within the bore or chamber 40 of the housing 14 with the grooves 88 on the arm 68 slidably engaging the pins 58. By virtue of this mounting, the mount 62 is capable of linear movements but is restrained from any rotary movements.

The mount 62 is disposed in the chamber 40 of the housing 14 with the slot 82 facing towards the electrical lead apertures 60. Mounted within the bore 76 of the mount 62 is the sleeve 166 and the transformer 148 with the leads 152, 154, 160 and 162 extending from the left side thereof, as viewed in FIGURE 4. The leads extend upwardly through the slot 82 and through hollow lead terminals 168, which are mounted in the apertures 60 of the housing 14.

Mounted in abutting relation with the right hand face of the mount 62, as viewed in FIGURE 4, is a washer 125 against which the one side of the wave spring 124 abuts. The opposite side of the wave spring 124 fits within the counterbore 107 of the plate 98 and abuts the adjacent face of the adjacent bellows mount 92. On either side of the housing 14 are assembled the bellows assemblies 90 with intermediately mounted sealing gaskets 172. The pins 50 extend through suitable apertures in the gaskets 172 and through the apertures 109 of the bellows mount 92.

The shaft-spacer-core assembly 136 is mounted through the bore 164 of the transformer 148. The opposite ends of the shaft 138 extend through the apertures 118 of the two bellows headers 96. A washer 174 is inserted between each of the bellows headers 96 and the shaft sleeves 146 to determine the spacing of the core 144 and the sleeves 146 on the shaft 138. A pair of washers 176 is mounted on opposite ends of the shaft 138 in abutting relation with the walls 119 of the bellows headers 96. The shaft 138 and the headers 96 are secured together in fixed relation by means of small nuts 178 threadedly attached to the theads 142 of the shaft 138, as clearly seen in FIGURES 3 and 4.

The cover members 12 are mounted on opposite sides of the plates 98 of the bellows assemblies 90 with sealing gaskets 180 disposed therebetween. O-ring seals 191 (see FIGURES 3 and 4), which are mounted in the counterbores 30 of the cover members 12, sealably engage the corner portion of the boss 100 of the mount 92 for further positive sealing.

The screws 18, which extend through appropriate openings in the cover members 12 and the gaskets 180 and 172 and through the apertures 104, threadedly engage in the apertures 42 of the housing 14 to fixedly secure the entire assembly. The adjusting screws 38 are threaded into the apertures 36 and engage, in abutting relation, the adjacent face of the mount 62 to exert adjusting lineal forces thereon against the force of the spring 124, which abuts an opposite face of the mount 62.

In operation, the transducer 10 is preferably mounted in the position illustrated in FIGURE 4. The two pressure ports 24 are connected to separate pressure sources, or one pressure port 24 is plugged off and only one pressure port 24 is connected to a source of pressure.

Before pressure is admitted to the transducer 10 through the ports 24, the position of the transformer 148 is adjusted by the screws 38. That is, adjustment of the screws 38 acts through the coil mount 62 and against the resilient spring 124. As the position of the coil mount 62 is varied, the position of the transformer 148 will also be altered with respect to the core 144.

Since the transformer 148 is a differential transformer, the secondary coils 156 and 158 are connected in series opposing or bucking relationship. The differential transformer 148 has, therefore, an electrical centerline which is the center of electrical symmetry of the coils 156 and 158. Thus, when the core 144 is bisected by the electrical centerline, the reference voltage applied to the primary coil 150 causes equal but opposite voltages in the coils 156 and 158. Accordingly, the voltages of the coils 156 and 158 cancel each other out and result in a zero transformer output. In this manner, the output of the differential transformer 148 may be adjusted to zero prior to the application of external pressure to the transducer 10.

Movement of the core or iron slug 144 in a direction away from the electrical centerline of the differential transformer 148 causes a voltage increase in the secondary coil, which is most proximate to the core 144. The voltage in this coil continues to increase as the displacement of core 144 from the transformer electrical centerline increases. For example, when the core 144, as viewed in FIGURE 21, is moved upward between the primary coil 150 and the secondary coil 158, the voltage induced in the secondary coil 158 increases. At the same time the voltage induced in the secondary coil 156 decreases. Accordingly, displacement of the core 144 from the electrical centerline of the transformer 148 induces a transformer output as a result of an unbalance of voltages induced in the opposing secondary coils 156 and 158. Therefore, the output of the differential transformer 148 is a function of the displacement of the core 144 from the transformer electrical centerline.

The output voltage of the differential transformer 148 bears a fixed phase relationship to the input reference voltage. That is, while the output is in phase with the input when the core 144 is displaced to one side of the electrical centerline, it is 180° out of phase with the reference voltage when it is displaced to the other side thereof.

It is clear from the foregoing that the voltages induced in the secondary coils are 180° out of phase with respect to each other and increase or decrease in magnitude as the position of the core 144 is varied. Since the voltages induced in the secondary coils 156 and 158 are opposite in sign, the output of the transducer 148 is substantially equal to the algebraic sum thereof.

Once the desired relationship of the mount 62 and the transformer 148 is obtained, by the setting of the screws 38, pressure can be admitted through one or both of the ports 24. The pressure admitted through the ports 24 is transmitted through the bores 34, the counterbores 30, and the axial bores 102 of the bellows mounts 92 to react against the walls 119 of the bellows headers 96.

If pressure is being applied through only one port, there is a movement of the bellows header 96 upon which pressure is being applied. This movement expands the associated bellows 94 to cause linear movement of the shaft-spacer-core assembly 136. As a result, the core 144 moves relative to the windings 150, 156 and 158 of the transformer 148 to move the core 144 to one side or the other of the electrical centerline. Therefore, an electrical output will result from the transformer 148 when the core 144 is displaced by either the action of pressure on a single bellows header 96 or by differential pressure when pressure is applied through the ports 24 to both of the headers 96.

It also is to be especially noted that, with the unique construction of the instant device, the two bellows assemblies 90 serve to wholly isolate or seal off the mount 62, the transformer 148, and the core 144 from the pressure being admitted through the ports 24. Thus, the deleterious effects of dust, moisture, and corrosive fluids or gases from the pressure inputs cannot act on and effect the accuracy of the transformer 148. Further, by this sealed relationship and the preferred upright mounting of the transducer 10, as illustrated in FIGURE 4, any moisture or other foreign substances admitted through the ports 24 will, by gravity, drain out of the transducer 10 back through the ports 24.

Thus, there is provided a pressure responsive transducer, which translates pressure stimuli into an electrical output. The transducer of the invention is extremely compact, sealed from damaging fluids or dirt, sensitive and accurate, and capable of being easily assembled and adjusted. The symmetrical aspects allow maintenance of balance during temperature changes alleviating the problem of thermal drift.

It should be understood that since the electrical output of the transducer of this invention has the characteristics of being variable in magnitude and reversible in phase, it may be advantageously employed in systems sensing either or both output characteristics. That is, the magnitude or phase of the output may be sensed, respectively, by meters or phase detectors or the like. Additionally, both output magnitude and phase may be sensed by a phase sensitive demodulator or the like. Further, the inventive pressure responsive device disclosed herein may merely be employed as a switch to energize or de-energize external circuitry or the like.

It also should be understood that the pressure responsive transducer of this invention may be employed in response to either water or air, or other liquid or gaseous fluid mediums.

Further, it should be understood that the shaft-spacer-core assembly 136 may be formed other than as specifically described. That is, the core 144 may be threaded upon the shaft 138 and the shaft 138 may be replaced by two shafts each having one end thereof threadedly engaging the core 144. In this manner, the sleeves 146 and the washers 176 could be eliminated. However, in such case, nuts such as nuts 178 would be required on both sides of the bellows headers 96.

For purposes of exemplification, a particular embodiment of the invention has been shown and described according to the present understanding thereof. However, it will be apparent that changes and modifications in the arrangement and construction of the parts thereof may be resorted to without departing from the spirit and scope of the invention.

I claim:

1. A transducer comprising a housing; a pair of spaced pressure ports in said housing; a pair of movable pressure responsive members mounted in said housing in spaced relation to each other; each of said pressure responsive members exposed on one side to the pressure from one of said pressure ports, each of said pressure responsive members sealing a pressure port from the other pressure port and from an interior intermediate portion of said housing; an adjustably movable mounting member mounted in sliding relationship within the interior intermediate portion of said housing; adjustment means in contact with said mounting member; and extending externally of said housing; a transformer fixedly mounted in said mounting member and having an electrical input; a movable core mounted in said transformer and movable relative thereto; said mounting member being adjustably movable by said adjustment means from a position externally of the housing to position said transformer independently of said core into a predetermined position with respect to each other whereby movement of said core from said predetermined position effectuates and controls an electrical output from said transformer; and means connecting each of said pressure responsive members and said core in a fixed spaced relationship whereby movements of said pressure responsive members are transmitted to said core to move said core from the predetermined position with respect to said transformer and transduce pressure stimuli into electrical energy.

2. A transducer comprising a housing and a pair of cover members mounted at opposite sides of said housing; a pressure port in each of said cover members; a pair of movable pressure responsive means mounted on said housing between said housing and each of the cover members; each of said pressure responsive means being substantially adjacent to a pressure port and exposed on one side to pressure from the adjacent pressure port; said pressure responsive means forming sealing barriers sealing said pressure ports from each other and from a chamber in said housing; a mounting member movably mounted in sliding relationship within said housing; a transformer mounted in said mounting member and having an electrical input; a movable core mounted for movement relative to said transformer; said mounting member being adjustable in said housing to independently position said transformer in a predetermined position with respect to said core whereby movement of said core from said predetermined position effectuates and controls an electrical output from said transformer; adjusting means mounted through one of said cover members so as to be adjustable from the exterior of said housing; said adjusting means extending into said housing and engaging said mounting member to adjust said mounting member and transformer independently of said core; and means fixedly connecting each of said pressure responsive means and said core in fixed spaced relation whereby movements of said pressure responsive means are transmitted to said core for moving said core from said predetermined position to effectuate and control an output from said transformer.

3. A transducer as claimed in claim 2 wherein said pressure responsive means comprise bellows assemblies having plate members intermediately mounted between said housing and each cover member and coextensive with the sides of said housing; relatively movable header members having a surface against which pressure from the pressure ports can react; resilient tubular convoluted bellows members connected in fluid tight relation to said plate members and header members; and an opening in said plate members substantially adjacent said pressure ports for allowing access into the interior of said bellows members whereby pressure from an adjacent pressure port passes into the interior of said bellows members and reacts against the surface of said header members to effect relative movement of said header members.

4. A transducer as claimed in claim 3 wherein the means fixedly connecting said bellows assemblies and said core in fixed spaced relation comprises a shaft fixedly connected to each of said header members; said core being mounted on said shaft; and spacer members on opposite sides of said core in abutting relationship with said core and said adjacent header members to maintain said core in a fixed spaced relation with said header members.

5. A transducer as claimed in claim 3 wherein said housing is provided with internal guide projections, and means on said mounting member for slidably engaging said guide projections to guide linear movements of said mounting member; and wherein each side of said housing is provided with locating means, and receiving means on each of said plate members of said bellows assemblies for receiving said locating means whereby each of said members are accurately located with respect to said housing.

6. A transducer as claimed in claim 2 comprising a primary coil means connected to said electrical input and secondary coil means, said secondary coil means having a first portion wound in series opposing relationship with a second portion thereof and having a center of electrical symmetry substantially coextensive with said predetermined position.

References Cited by the Examiner
UNITED STATES PATENTS

| | | | |
|---|---|---|---|
| 2,318,271 | 5/1943 | Weiche | 336—134 X |
| 2,664,749 | 1/1954 | Jones | 336—30 X |
| 2,707,001 | 4/1955 | Hathaway | 336—30 X |
| 2,921,279 | 1/1960 | Cosby, et al. | 336—30 |
| 2,945,378 | 7/1960 | Martin | 336—30 X |

JOHN F. BURNS, *Primary Examiner.*